(12) United States Patent
Burt

(10) Patent No.: US 6,450,421 B1
(45) Date of Patent: Sep. 17, 2002

(54) SCREEN CLEANING DEVICE

(75) Inventor: Stephen John Burt, Reading (GB)

(73) Assignee: Textron Limited, London (GB)

(*) Notice: Subject to any disclaimer, the term of this patent is extended or adjusted under 35 U.S.C. 154(b) by 0 days.

(21) Appl. No.: 09/673,452

(22) PCT Filed: Apr. 16, 1999

(86) PCT No.: PCT/GB99/01175
§ 371 (c)(1),
(2), (4) Date: Oct. 17, 2000

(87) PCT Pub. No.: WO99/54177
PCT Pub. Date: Oct. 28, 1999

(30) Foreign Application Priority Data

Apr. 17, 1998 (GB) .............................................. 9808184

(51) Int. Cl.⁷ ............................................... B05B 1/10
(52) U.S. Cl. ................................ 239/284.1; 239/284.2; 239/104; 239/120; 239/124; 239/126; 15/250.01; 15/250.02
(58) Field of Search ..................... 239/284.1, 284.2, 239/104, 120, 124, 126; 15/250.01, 250.002, 250.003

(56) References Cited

U.S. PATENT DOCUMENTS

| | | | |
|---|---|---|---|
| 2,968,071 A | * | 1/1961 | Perna |
| 3,469,088 A | * | 9/1969 | Coleman et al. |
| 3,913,840 A | * | 10/1975 | Kato ........................ 239/284.1 |
| 4,531,255 A | * | 7/1985 | Yagasaki et al. ......... 15/250.01 |
| 5,403,060 A | * | 4/1995 | Durand et al. ....... 239/284.1 X |
| 5,965,950 A | * | 10/1999 | Park ..................... 15/250.01 X |

FOREIGN PATENT DOCUMENTS

| | | | |
|---|---|---|---|
| DE | 32 43 173 | * | 5/1984 |
| DE | 38 33 579 | * | 4/1990 |
| DE | 43 35 829 | * | 4/1995 |

* cited by examiner

Primary Examiner—Robin O. Evans
(74) Attorney, Agent, or Firm—Rothwell, Figg, Ernst & Manbeck

(57) ABSTRACT

Apparatus for maintaining a vehicle screen (12) supported with respect to a vehicle by a gasket (16, 24), said screen (12) comprising first (22) and second (27) edge regions wherein said gasket (16, 24) has a first conduit (20) means having an opening (21) proximate to said first edge region (22) and second conduit (25) means having an opening (26) proximate to said second edge region (27) and wherein the apparatus further comprises supply apparatus coupled to said first conduit means (20) for supplying a liquid thereto and collection apparatus coupled to said second conduit (25) means for collecting said liquid.

19 Claims, 2 Drawing Sheets

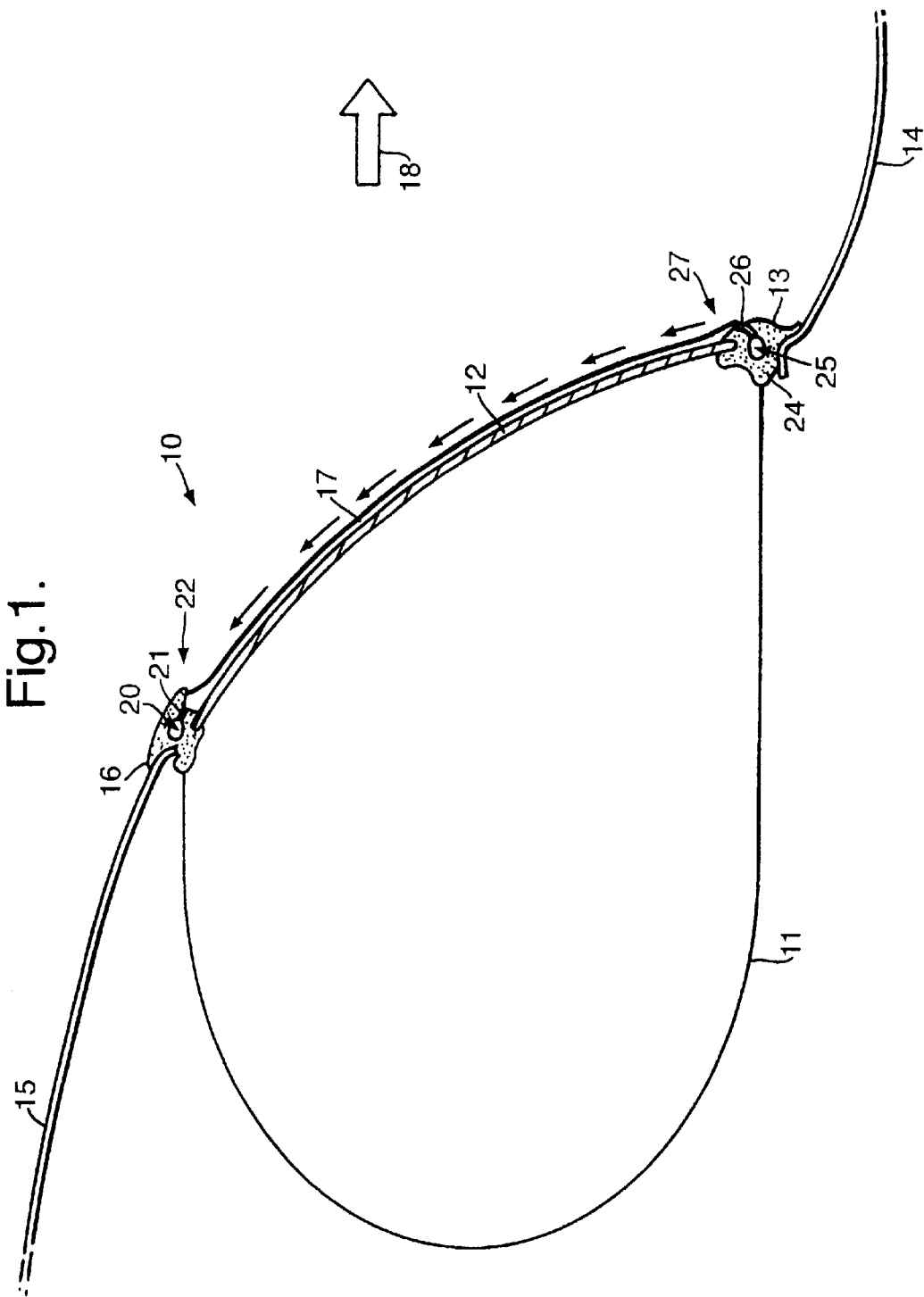

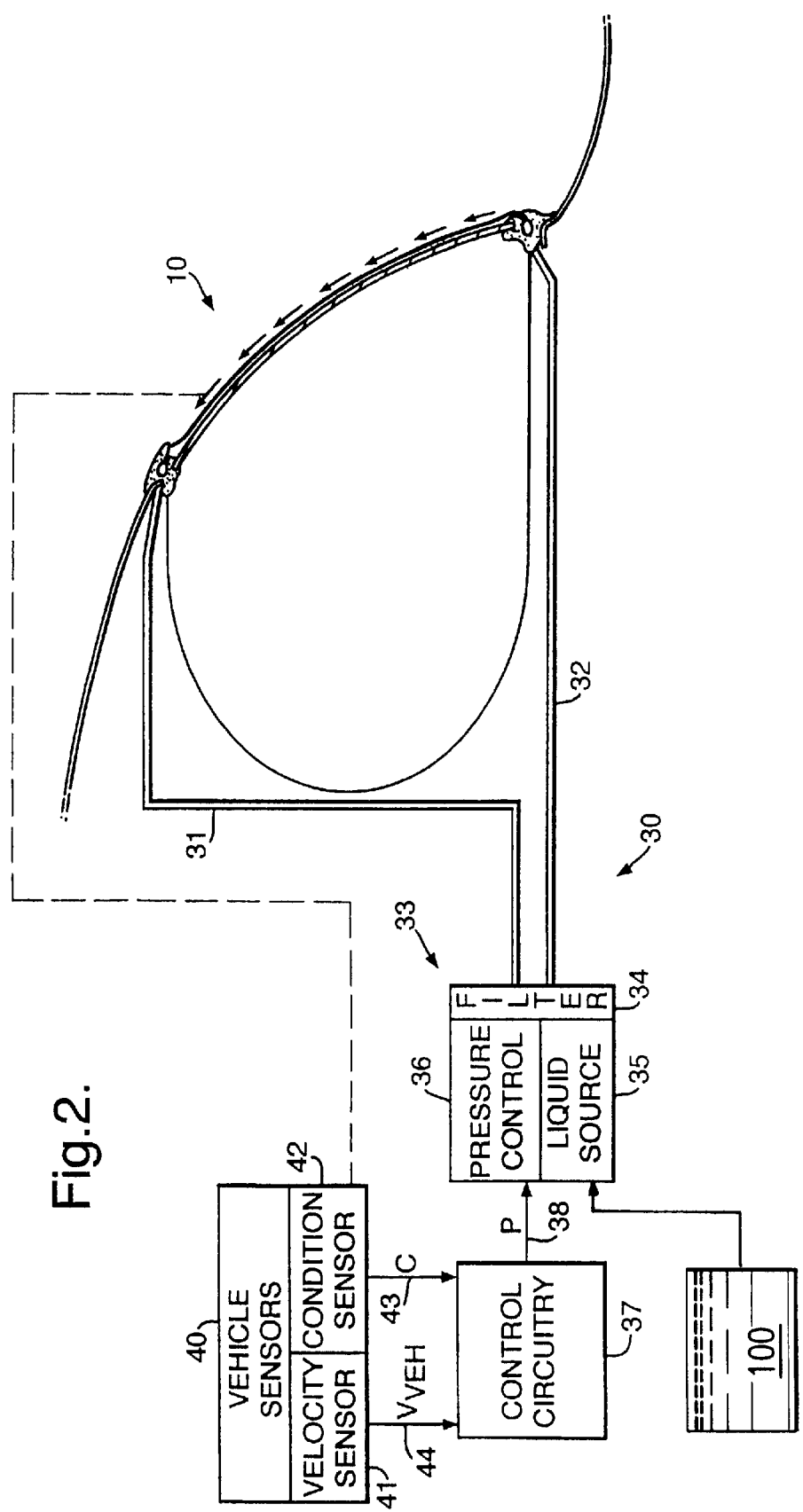

SCREEN CLEANING DEVICE

BACKGROUND OF THE INVENTION

1. Field of the Invention

The present invention relates to a method and apparatus for maintaining a vehicle screen such as for example a vehicle headlamp.

2. Description of the Related Art

Vehicle screens such as headlamp lenses and windscreens require cleaning in order to retain their translucent properties. As dirt is deposited and collects on the surface of the screen the amount of light passing through the screen is diminished. In the case of a windscreen this reduces visibility. In headlamp applications deposited dirt on the lens can form a reflective layer as well as reducing light output. Light can therefore be reflected back towards the reflector and out of the headlamp in undetermined directions thereby causing glare. This problem is exacerbated by the heating effect caused by the light beam. As liquid contacts the headlamp lens, the beam tends to heat and thereby evaporate the liquid leaving any dirt previously suspended in the liquid on the surface of the headlamp. This so-called "burn-on" effect can increase the glare from a headlamp substantially.

Numerous techniques have been suggested in the past for overcoming these problems. Some of these solutions have used wipers to remove the dirt often requiring some form of water nozzle to spray water or cleaning liquid onto the screen surface prior to wiper action.

Problems are associated with many of these solutions. For example, they are prone to mechanical failure of the wiper components and to a cleaning liquid reservoir becoming empty since the liquid is not recycled but is lost as soon as it is sprayed. Furthermore, the driver is usually required to take positive action to clean the screen.

It is therefore an object of the present invention to at least partly mitigate the difficulties of the prior art.

SUMMARY OF THE INVENTION

According to a first aspect of the present invention there is provided a method of maintaining a surface of a translucent screen of a vehicle comprising the steps of providing a first edge region of said screen surface with liquid, causing the liquid to flow across the surface from the first edge region in the direction of a second edge region, and collecting said liquid in said second edge region, whereby said first edge region is selected from a top edge region and a bottom edge region, located below said top edge region, in response to said detected vehicle velocity.

According to a second aspect of the present invention there is provided apparatus for maintaining a vehicle screen supported with respect to a structure by a gasket, said screen having a first and second edge region, said gasket having first conduit means having an opening proximate to said first edge region and second conduit means having an opening proximate to said second edge region, wherein said structure is a vehicle and said screen is a headlamp screen and said first edge region is disposed below said second edge region, and wherein the system further comprises supply apparatus connectable to said first conduit means for supplying a liquid thereto and collection apparatus connectable to said second conduit means for collecting said liquid.

DESCRIPTION OF THE SEVERAL VIEWS OF THE DRAWINGS

An embodiment of the present invention will now be described hereinafter by way of example only with reference to the accompanying drawings in which:

FIG. 1 shows a cross-section to a vehicle headlamp for use in accordance with the present invention.

FIG. 2 shows a schematic layout including the vehicle head lamp and screen maintenance apparatus.

DETAILED DESCRIPTION OF THE PREFERRED EMBODIMENTS

In the Figures, like reference numerals refer to like parts.

Referring now to FIG. 1, a headlamp 10 comprises a translucent screen 12, hereinafter referred to as a lens having an upper edge region 22 and a lower edge region 27, a body portion 11 and gasket portions 16, 24. The lens is secured around its periphery to the body portion 11 via the gasket portions. In the preferred embodiment the gasket may be formed by a tubular elastomeric moulding. The lens is of plastics, eg polycarbonate and has a generally convex cross-section. The upper edge region is disposed rearwardly of the lower edge region, to the left as seen in the Figure. The lower edge region is thus below the upper edge region.

The headlamp housing is secured to a first lower vehicle panel 14, and a second upper vehicle panel 15 to which are fixed the gasket portions 24, 16 respectively surrounding the headlamp lens 12.

A light bulb and reflector (not shown) are supported in the body portion 11 in a conventional manner to provide a beam of light from the headlamp.

A first vehicle panel 14 is generally disposed below the lower edge region 27 of the lens 12 and extends generally forward of the lens. A second vehicle panel 15 is disposed generally above the upper edge region 22 of the lens and extends generally rearwardly of the lens. The second panel 15 has a generally convex region proximate the lens 12 so as to provide a generally air-smoothed form. The shape of the panel 14, lens 12 and panel 15 is such that as the vehicle moves forward in the direction of the arrow 18, air flowing across the front of the vehicle flows generally upwardly across the outer surface of the lens 12 in the direction shown by the small arrows shown in FIG. 1.

The portion 16 of the gasket to which is secured the upper edge of the lens 12 has a first conduit 20 running through it. A liquid may flow along the conduit, as will be described herein below. A first duct 21 leads from the first conduit 20 through the gasket wall to a region 22 at the top edge of the lens.

Likewise the portion 24 of the gasket which is secured to the lower edge of the lens has a second conduit 25 running through it along which a liquid can flow. A second duct 26 leads from the second conduit 25 to a region 27 at the bottom edge of the lens.

FIG. 2 shows liquid supply apparatus 30 which includes a first and second connecting pipe 31, 32, a filter portion 34, a liquid source 35 (for example a self-wetting formulation) and a pump 36. The first connecting pipe 31 is connected to the first conduit 20 to allow liquid to flow through the pipe 31 into first conduit 20. The connecting pipe 32 is connected to the second conduit 25. The two connecting pipes 32, 31 are also connected to liquid control apparatus 33.

The liquid control apparatus 33 includes the filter portion 34, liquid source 35 and the pump 36. The filter portion 34 is connected to the other end of each of the connecting pipes 31, 32. Liquid 35 is stored in a container (not shown) to provide a source of the liquid. The liquid is pumped to and from the container along the connecting pipes 31, 32 by a pump 36.

Liquid control apparatus 30 is connected to receive control signals from control circuitry 37 along control signal line 38. The control circuitry 37 is connected to vehicle sensor apparatus 40. The vehicle sensor apparatus includes a velocity sensor 41 for detecting the vehicle velocity and a headlamp condition sensor 42 for controlling cleaning of the headlamp. The headlamp condition sensor 42 may be any type of sensor capable of detecting the quantity of dirt or contaminant on the surface of the screen. For example such a sensor may be a surface resistivity sensor or a temperature detector or a scattered light detector.

The headlamp condition sensor 42 is connected to control circuitry 37 by a first signal line 43. The sensor outputs a condition control signal C on signal line 43 which is input to the control circuitry 37 for controlling liquid supply to the screen. The vehicle velocity sensor 41 is connected to the control circuitry 37 by a second signal line 44 and outputs a signal $V_{VEH}$ on said signal line 44 indicating the detected velocity of the vehicle.

In response to the signals from the velocity sensor 41 and headlamp condition sensor 42 the control circuitry 37 outputs a control signal P on control signal line 38 which controls operation of the liquid supply apparatus 30. The condition control signal C causes the control circuitry to supply liquid to the screen whilst the vehicle velocity signal $V_{VEH}$ selects the mode in which liquid is supplied.

When liquid supply is initiated the cleaning apparatus can operate in two modes as will be described hereinbelow.

In a first mode the vehicle velocity is below a threshold velocity and liquid flows generally downwardly across the lens surface under the force of gravity. In this mode the control signal P from control circuitry 37 controls pump 36 to apply a positive pressure to supply liquid by pumping liquid from the liquid source 35 along first connecting pipe 31 to the first conduit 20 in gasket portion 16. Liquid from the gasket flows through the first duct 21 to the upper edge region 22 at the upper edge of the lens. The liquid in region 22 flows downwards across the lens surface under the force of gravity where it is collected in lower edge region 27 at the lower edge of the lens. The collected liquid flows through the second duct 26 under negative pressure (caused by sucking) from the pump and into the second conduit 25 running through the portion 24 of the gasket. The liquid flows from the second conduit 25 along the second connecting pipe 32 through the filter portion 34 and returns to the liquid source 35 thereby recycling the liquid.

In the second mode of operation the vehicle velocity is above a threshold velocity such that the air flow shown by the small arrows in FIG. 1 across the surface of the lens is sufficient to cause liquid provided by the second duct 26 into the lower edge region 27 to flow generally upwardly across the surface of the lens where it collects in upper edge region 22 at the upper edge of the lens. In this second mode control signal P on control signal line 38 controls the pump 36 to supply liquid from the liquid source 35 along the second connecting pipe 32 to the second conduit 25 running through the lower portion 24 of the gasket. Liquid in the gasket conduit 25 flows through second duct 26 to the lower edge region 27 at the lower edge of the lens. The liquid in region 27 is induced to flow upwardly by the movement of air caused by the vehicle motion and collects in the upper edge region 22 at the upper edge of the lens. The collected liquid flows through the first duct 21 into the first conduit 20 running through the gasket portion 16. The liquid flows from the conduit 20 along the first connecting pipe 31 through the filter portion 34 and returns to the liquid source 35 thereby recycling the liquid.

In both the situation where fluid flows downwards under gravity and upwards as a result of air flow due to vehicle motion the result is that the fluid 17 spreads thinly across the part of the surface of the lens where cleaning is desired. The fluid is provided at one edge region of the screen and collected in another edge region depending upon the velocity of the vehicle. As a result any dirt which would otherwise have settled and accumulated on the headlamp lens thereby causing a deterioration in the translucency of the lens is instead entrained in the fluid film flowing over the screen. The fluid, after flowing across the screen, is filtered in the filtering apparatus to keep the fluid clean prior to recycling.

It will be appreciated that fluid flow is also to some extent dependent on the lens geometry and that instead of fluid flow being generally upwardly and/or downwardly configurations of lens or the surrounding airflow inducing structure could cause liquid to flow to collecting regions in the side edges of the screen where ducts and conduits in the gasket could be provided to enable to liquid to be recycled.

In this way the present invention provides a method and apparatus for keeping the lens or screen of a vehicle headlamp clean whilst recycling the cleaning fluid used, thereby reducing the maintenance required to keep the cleaning fluid "topped-up".

It will also be appreciated that as the liquid is recycled some regeneration of the liquid may be required to maintain the liquid at a desired composition. For example under precipitous weather conditions the liquid may tend to become more dilute as some water falling on the screen may be collected with the liquid and be recycled. Likewise under high temperature conditions the concentration of the liquid may be affected. In order to overcome these problems it is envisaged that an adjustable dosing tank 100 could be provided to supply doses of concentrate to the liquid source in order to maintain the liquid within a desired range of concentration.

Although the present invention has been described in respect of vehicle headlamps it will be understood that the invention could be adapted to provide cleaning for any screen where cleaning is desired for example trains, aircraft and the like.

It will also be understood that the invention may be adapted for use in only one of the two described modes of operation. In applications for vehicles which are only capable of slow motion or where the vehicle configuration does not allow sufficient upward air flow across the screen, the invention only operates in the first mode of operation where liquid flows downwards across the lens due to gravity. Alternatively the invention may operate only when the vehicle is travelling at relatively high velocities when only the second mode of operation will be required.

What is claimed is:

1. An apparatus for maintaining a vehicle screen supported with respect to a vehicle by a gasket, said screen including first and second edge regions and said gasket including a first conduit means having an opening proximate to said first edge region and a second conduit means having an opening proximate to said second edge region;

said apparatus comprising:
    a liquid supply apparatus connectable to said first and second conduit means for supplying a liquid thereto and collection apparatus connectable to said first and second conduit means for collecting said liquid; and
    vehicle velocity detecting apparatus adapted to determine a velocity of said vehicle and output a vehicle velocity signal for controlling the supply of liquid to the screen;
    wherein said supply apparatus is connectable to one of said first or second conduit means in response to said vehicle velocity signal.

2. An apparatus according to claim 1 wherein said supply apparatus comprises a pump for applying a positive pressure to said first edge region to thereby pump fluid through said first conduit means to the first edge region.

3. An apparatus according to claim 1 wherein said collecting apparatus comprises a pump for applying a negative pressure to said second edge region to thereby pump fluid through said second conduit means from the second edge region.

4. An apparatus according to claim 1 wherein said first edge region is disposed above said second edge region.

5. An apparatus according to claim 1 wherein said first edge region is disposed below said second edge region.

6. An apparatus according to claim 1 further comprising a screen condition detection apparatus adapted to detect a condition of said screen and including a condition control signal apparatus for providing a control signal for controlling a liquid supply to the screen.

7. An apparatus according to claim 6 wherein said screen condition detection apparatus is a sensor adapted to detect the quantity of dirt or contaminant on a surface of said screen.

8. An apparatus according to claim 7 wherein said sensor is a surface resistivity sensor or a temperature detector or a scattered light detector.

9. Apparatus according to claim 1 wherein said supply apparatus further comprises a liquid source and said collected liquid is returned to said liquid source thereby recycling the liquid.

10. An apparatus according to claim 1 further comprising a filter for filtering a collected liquid.

11. An apparatus according to claim 1 further comprising a dosing tank for supplying concentrate to the liquid supply apparatus to thereby regenerate said liquid.

12. An apparatus according to claim 1 wherein said vehicle is an automobile.

13. An apparatus according to claim 1 wherein said vehicle is an aircraft.

14. An apparatus according to claim 1 wherein said vehicle is a train.

15. A method of maintaining a surface of a translucent screen of a vehicle having a plurality of edge regions comprising the steps of:
   detecting a vehicle velocity and, responsive to said detected velocity, providing a first edge region of said screen surface with liquid;
   causing the liquid to flow across the surface from the first edge region in the direction of a second edge region; and
   collecting said liquid in said second edge region;
   whereby said first edge region is selected from a top edge region and a bottom edge region, located below said top edge region, in response to said detected vehicle velocity.

16. A method according to claim 15 further comprising the steps of
   providing liquid to the first region under positive pressure; and
   collecting liquid from the second region under negative pressure.

17. A method according to claim 15 wherein said first region lies below said second region, said method further comprising the steps of causing the liquid to flow upwards via air flow.

18. A method according to claim 15 wherein said second region lies below said first region, said method further comprising the step of causing the liquid to flow downwards by gravity.

19. A method according to claim 15 further comprising the steps of
   detecting a condition of the vehicle screen and outputting a condition control signal for controlling liquid supply to the screen.

* * * * *